Figure 1:
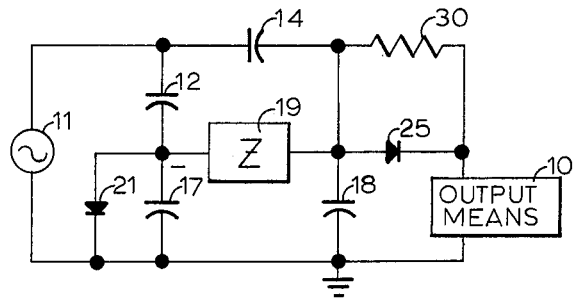

Jan. 18, 1966   R. B. METZ ETAL   3,230,519
CAPACITIVE SENSING DEVICE

Filed Feb. 13, 1964   2 Sheets-Sheet 1

INVENTORS
RAMEY B. METZ
STANLEY M. KERBER
BY
*Edward A. Sokolski*
ATTORNEY

INVENTORS
RAMEY B. METZ
STANLEY M. KERBER
BY
*Edward A. Sokolski*
ATTORNEY

_United States Patent Office_

3,230,519
Patented Jan. 18, 1966

3,230,519
CAPACITIVE SENSING DEVICE
Ramey B. Metz, Anaheim, and Stanley M. Kerber, Fullerton, Calif., assignors to Tamar Electronics Industries, Inc., Anaheim, Calif., a corporation of Delaware
Filed Feb. 13, 1964, Ser. No. 344,712
10 Claims. (Cl. 340—258)

This invention relates to a capacitive sensing device and more particularly to such a device of high sensitivity capable of detecting the presence or the absence of objects fabricated either of electrically conductive or dielectric material.

Electrical sensors of the magnetic and capacitive type are utilized quite widely in the detection of the absence or presence of objects in automatic conveyor control systems, such as described, for example, in co-pending application Ser. No. 327,746 entitled Spacing Control Circuit, Ramey B. Metz, inventor, filed Dec. 3, 1963.

Magnetic sensors, while they generally have adequate sensitivity and function reasonably well for the intended purpose, have a limitation in that they are only capable of sensing objects having magnetic material therein. Thus, they are not capable of detecting non-magnetic metal or dielectric material. Such sensors therefore cannot be used to check the presence of such objects as foodstuff, bottles, objects of non-ferrous metals, or other such non-magnetic objects.

Most of the capacitive sensors of the prior art have limited sensitivity and are generally only capable of sensing the presence or absence of metallic objects. Some typical capacitive sensors utilize the object itself to form one of the plates of the capacitor. Most of such prior art sensors are incapable of detecting the appearance of objects made of low dielectric material; where such detection is possible, the sensitivity of the associated sensing circuit to the minute changes of capacitance resulting is so low as to require extensive amplification circuitry to produce a useful output signal.

The device of this invention overcomes the shortcomings of prior art sensing devices in providing a simple capacitive type sensor utilizing a minimum number of parts which is capable of detecting the presence or absence of a great variety of types of both electrically conductive and dielectric materials. The device of this invention utilizes a highly sensitive detection circuit which operates in conjunction with a capacitive sensing head. This circuit while of simple and economical construction and utilizing a minimum number of parts is capable of producing a usable output signal in response to very minute changes of the effective capacitance of the sensing head resulting from the proximity of either dielectric or electrically conductive objects.

The detection circuit utilized in the device of the invention comprises a capacitive bridge. The capacitive legs of the circuit are bridged by impedance means which provides a D.C. path therebetween. The sensing head forms one of the legs of the bridge and is shunted by unidirectional current means which establishes a D.C. reference voltage. This reference voltage is coupled to an output means. The voltage appearing across the leg of the bridge opposite the capacitive sensing head is fed to second unidirectional current means to produce a current flow therethrough which results in a voltage at the output means which has a polarity opposite to that of the reference voltage. The difference between these two voltages is utilized as the drive signal for the output means. In the absence of an object before the sensing head, this difference signal has a first predetermined value which is zero in the case of a balanced bridge having equal voltages across its legs. When an object appears before the head, an unbalance is introduced in the bridge by virtue of the resultant increase in the capacitance of the sensing head to produce a substantial difference signal to the output means.

In a preferred embodiment of the device of the invention, the impedance element joining the legs of the bridge together is an inductor, which forms a resonant circuit at the frequency of the signal source with the bridge capacitors and the effective capacitance of the associated circuitry. The use of such resonant elements greatly increases the magnitude of the output signal that can be obtained for a given change in the capacitance of the sensing head, this by virtue of the high circulating currents developed in such a resonant circuit. On the other hand, the resonant circuit produces a negligible output voltage change with variations in oscillator frequency.

The sensing head which is utilized in a preferred embodiment of the device of the invention has a unique configuration and is incorporated in the cover of the container housing the sensing circuitry.

It is therefore an object of this invention to provide an improved capacitive sensor.

It is a further object of this invention to provide a capacitive sensor having high sensitivity which is capable of detecting both electrically conductive and dielectric objects.

It is still another object of this invention to provide a highly sensitive capacitive sensor which is of simple construction and economical fabrication.

It is still another object of this invention to provide a capacitive sensor utilizing an improved sensing head.

It is still another object of this invention to provide a capacitive sensor utilizing a bridge circuit of substantially higher sensitivity than similar prior art devices.

Figure 2:
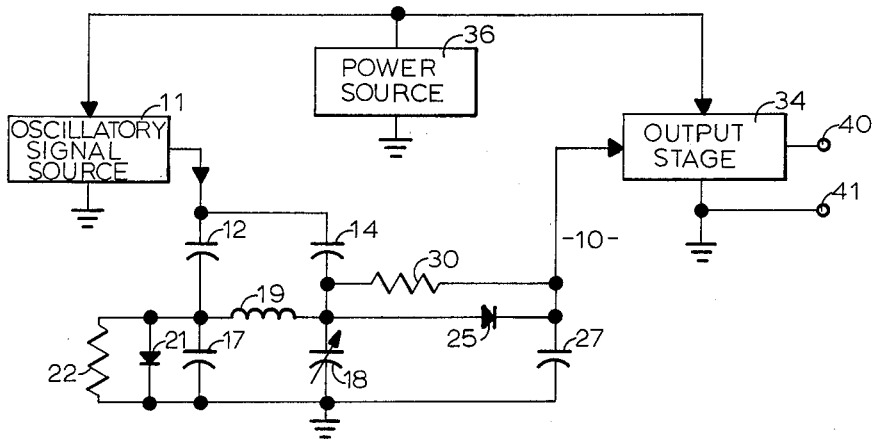
Figure 4:
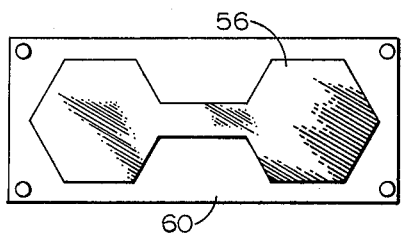
Figure 3:
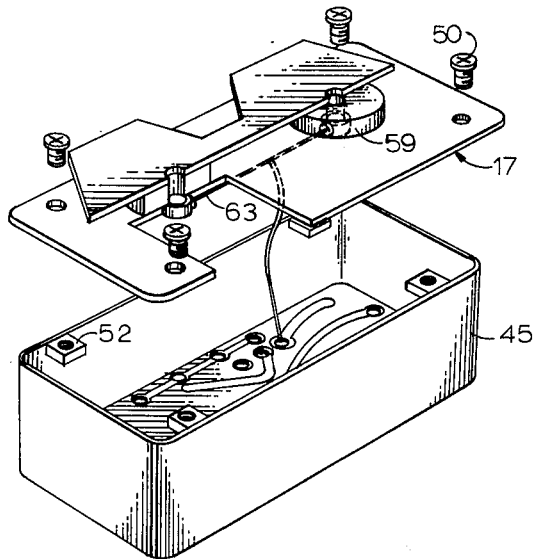
Figure 5:
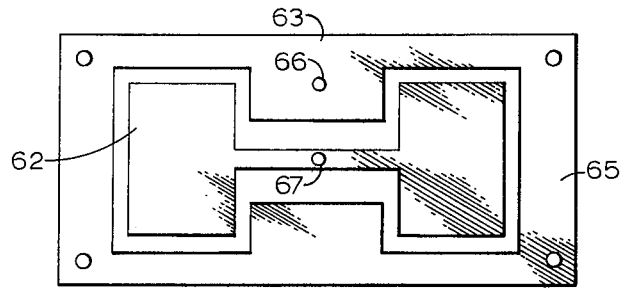

Other objects of this invention will become apparent from the following description taken in connection with the accompanying drawings of which FIG. 1 is a simplified schematic diagram illustrating the basic operation of the device of the invention, FIG. 2 is a schematic diagram of a preferred embodiment of the device of the invention, FIG. 3 is a perspective view of a container which may be utilized to house the device of the invention and a first sensing head which may be utilized as the cover thereof, FIG. 4 is a top plan view of the sensing head shown in FIG. 3, and FIG. 5 is a top plan view of second sensing head which may be utilized as the cover of a container of the type shown in FIG. 3.

Referring now to FIG. 1, a simplified schematic diagram illustrating the operation of the device of the invention is shown. A capacitive bridge circuit has its legs formed by capacitors 12, 14, 17, and 18. The capacitive legs of this bridge are joined together by impedance 19. An oscillatory signal which may, for example, be in the neighborhood of 5 megacycles is fed across the bridge from oscillatory signal source 11. "Capacitor" 17 is a sensing head which varies in capacitance in accordance with the appearance of objects in the vicinity thereof. Shunted across capacitive sensing head 17 is clamping diode 21. The bridge is designed so that the capacitance of capacitor 12 is equal to the capacitance of capacitor 14.

With no objects before sensing head 17, capacitor 18 is substantially equal in capacitance to that of sensing head 17. Under such conditions, the bridge is in a "null" condition. Clamping diode 12 negatively clamps the A.C. voltage which appears at its anode to result in an average negative voltage with respect to ground at the junction between "capacitor" 17 and impedance 19. This average negative voltage is coupled through impedance 19 and resistor 30 and also appears across output means 10. With the bridge in its "null" condition, the voltage across capacitor 18 is equal to that across "capacitor" 17. The voltage across capacitor 18 is rectified by diode 25 to result in a positive voltage across output 10 equal and opposite to that resulting from the clamping action of diode 12 which produces zero net voltage. Therefore, under such "null" conditions, there is no signal fed to output means 10.

With the appearance of an object before sensing head 17, the effective capacitance of the sensing head increases by virtue of the coupling effect of the object. As the effective capacitance of sensing head 17 increases, its reactance decreases. The loading effect of this decrease in reactance, tends to cause the average negative D.C. voltage level produced at the junction between sensing head 17 and impedance 19 to drop closer to ground level. Thus, the negative reference voltage across output means 10 decreases. With such unbalancing of the bridge, the positive voltage across the output 10 developed by virtue of the current flow from capacitor 18 through diode 25 exceeds the negative reference voltage to result in a net positive output signal to the output means.

The output signal produced by the circuit shown in FIG. 1 for a given variation in the capacitance of sensing head 17, can be increased substantially by utilizing for impedance 19 an inductor which resonates at the frequency of signal source 11 with the capacitive elements in the bridge circuit. Such a circuit is shown in the preferred embodiment of the invention illustrated in FIG. 2. In this circuit, like numerals are utilized to identify like components shown in FIG. 1. The bridge circuit which includes fixed capacitors 12 and 14 as the top legs thereof and capacitive sensing head 17 and variable trimmer capacitor 18 as the bottom legs is excited by oscillatory signal source 11. Oscillatory signal source 11 has an output in the radio frequency or high audio frequency range and can be of the self excited type. A Clap oscillator which is a Colpitts circuit having a high "Q" output has been found to operate satisfactorily. Output stage 34 may be a conventional transistor amplifier either of the emitter follower or common emitter variety.

Power is supplied to the oscillatory signal source 11 and output stage 34 from power source 36. The output of power source 36 may be D.C., or if synchronous operation is desired as shown in the aforementioned pending application Ser. No. 327,746, a pulsating D.C. source may be used which is synchronized with the A.C. power source for the spacing control circuit with which the sensor is utilized. Resistors 22 and 30 provide leakage paths for the capacitors with which they are associated to prevent the buildup of residual voltages.

The circuit shown in FIG. 2 operates similarly to that described in connection with FIG. 1 except for the substantially higher output voltage produced across capacitor 27 for a given change in the effective value of sensing head 17. Such a substantially higher output is achieved by virtue of the high circulating currents present in the resonant circuit.

The resonant circuit illustrated in FIG. 2 can readily be adjusted to operate at the peak of the resonance curve, where output is highest and sensitivity to frequency changes is at a minimum, by adjusting the output frequency of oscillatory signal source 11. In achieving such an adjustment with no objects before sensing head 17, variable capacitor 18 is lowered in capacitance to unbalance the bridge to produce some measurable output voltage across capacitor 27 (e.g. 1 volt). The frequency of oscillatory signal source 11 is then adjusted to produce maximum output voltage across capacitor 27 indicating that the resonant condition has been achieved. This of course must be done without varying the amplitude of the output of signal source 11. The same "tuning" can, of course, be achieved by making inductor 19 variable and adjusting its inductance for resonance as indicated by maximum output.

In an operative embodiment of the device of the invention constructed in accordance with the schematic illustration of FIG. 2, a variation in the capacitance of sensing head 17 of only .5 mmfd. from a nominal value of 8 micro-micro farads produces a change in the voltage across capacitor 27 of .1 volt which is sufficient to drive output stage 34.

Typical values for the embodiment illustrated in FIG. 2 as utilized with an oscillatory signal source having an output at about 5 megacycles are as follows:

| | |
|---|---|
| Capacitors 12 and 14 | 47 mmfd. |
| Capacitor 18 (trimmer) | .8–18 mmfd. |
| Inductor 19 | 36 microhenries. |
| Capacitor 17 | 8 mmfd. (nominal value). |
| Diodes 21 and 25 | Type 1N542 germanium matched pair. |
| Resistors 22 and 30 | 270 kilohms. |
| Capacitor 27 | .005 mfd. |

Referring now to FIGS. 3 and 4, a first embodiment of sensing head 17 which may be utilized in the device of the invention is shown. All of the circuitry shown in FIG. 2 is housed in container 45. Capacitive sensing plate 17 forms the top of this container and is attached thereto by means of screws 50 which fit into tapped portions 52 of the container. One side of the capacitor formed by the sensing head is provided by plate member 56 which may be fabricated of a suitable conductive material such as aluminum or copper. Plate member 56 is coated with a material such as Du Pont "Teflon" which is a good insulator and has a very high surface tension. Plate member 56 is mounted on board 60, which may be of an insulating material such as fiberglass, by means of insulating mounts 59 which are fixedly attached to the plate member and the board by suitable means (not shown). These insulating mounts may also be of "Teflon." The two sections of the plate member are connected to bus bar 63 by means of a feed through wire (not shown) which runs through supports 59.

The sensing head illustrated in FIGS. 3 and 4 is particularly useful where it is anticipated that there might be liquid splashed in the vicinity of the sensing device. With the plate member 56 coated with Teflon and with this plate member separated from board 60 by the Teflon mounts 59, liquid will not readily adhere to the plate member surfaces or between such surfaces and the case to cause unwanted capacitance changes. The other plate of the "sensing capacitor" is formed by the metallic walls of container 45.

Referring to FIG. 5, a second type of sensing head which may be utilized with the device of the invention is illustrated. Similarly to the head illustrated in FIGS. 3 and 4, the head of FIG. 5 forms the cover of the container for the circuitry. The sensing head of FIG. 5 is formed by etched circuit techniques, separated conductive portions 62 and 63 being formed on fiberglass backing 65 by etching techniques well known in the art. Conductive portions 62 and 63 form the two plates of the sensing capacitor. These two plates are connected to the sensing circuitry contained within the associated container by means of wire leads (not shown) which are attached at points 66 and 67. Although the embodiment shown in FIG. 5 does not have the capability of resisting the effects of liquids as the embodiment shown in FIG. 3 and FIG. 4, it is considerably more economical to fabricate and is suitable for utilization where there is no problem involving the splashing of liquids.

The device of this invention thus provides a simple yet highly effective means for sensing the presence of both electrically conductive and dielectric objects. Extremely high sensitivity is achieved by the utilization of a resonant bridge circuit. The device can be operated with a simple sensing head which forms the cover for the container in which the circuitry is housed.

While the device of the invention has been described and illustrated in detail, it is to be clearly understood that this is intended by way of illustration and example and is not to be taken by way of limitation, the spirit and scope of this invention being limited only by the terms of the following claims.

We claim:
1. In a capacitive sensor,
   a capacitive bridge circuit, a capacitive sensing head forming one of legs of said bridge circuit, impedance means forming the bridging element of said bridge circuit,
   an oscillatory signal source connected across said bridge circuit,
   uni-directional current means connected across said sensing head for establishing a reference voltage at one of the ends of said bridging element,
   output means,
   means for coupling said reference potential to said output means, and
   uni-directional current means for feeding a signal from the other end of said bridging element to said output means,
   whereby when there are no objects before said sensing head, the reference voltage is substantially equal and opposite to said signal resulting in zero net output to said output means, and when objects appear in the vicinity of said sensing head, said reference voltage decreases resulting in an output signal to said output means.

2. The device as recited in claim 1 wherein said impedance means is an inductor which resonates with the effective capacitance of said bridge circuit at the output frequency of said oscillatory signal source.

3. In a capacitive sensor,
   a capacitive bridge circuit, a capacitive sensing head forming one of legs of said bridge circuit, impedance means forming the bridging element of said bridge circuit,
   oscillatory signal source means for providing an excitation signal to said bridge circuit,
   clamping means for establishing a reference potential at said bridging element,
   an output means,
   means for coupling said reference potential to said output means, and
   uni-directional current means connecting said bridging element to said output means,
   whereby when there are no objects before said sensing head, the reference voltage is equal and opposite to the voltage produced by the current flowing through said uni-directional current means, and when objects appear before said head a difference voltage therebetween is produced across said output means.

4. The sensor as recited in claim 3 and further including container means for housing said circuit, said container means having a cover, said cover comprising said sensing head.

5. The sensor as recited in claim 4 wherein said cover includes a board fabricated of insulating material and a conductive plate member mounted on said board, said plate member being coated with a material having a high surface tension, the main body of said container being at least partially fabricated of conductive material.

6. In a capacitive sensor,
   a capacitive bridge circuit, a capacitive sensing head forming one of the legs of said circuit, impedance means forming the bridging element of said circuit, one end of said impedance means being connected to said sensing head,
   an oscillatory signal source connected across said bridge circuit,
   uni-directional current means connected between the other end of said impedance means and said output means for coupling a D.C. signal to said output means in accordance with the voltage at the other end of said impedance means,
   second uni-directional current means connected across said sensing head for establishing a reference potential of opposite polarity to said D.C. signal, and
   means for coupling said reference potential to said output means,
   whereby when there are no objects before said sensing head, said reference potential and said D.C. signal cancel each other out and when an object appears before said head, a difference signal therebetween is produced across said output means.

7. In a capacitive sensing device,
   a capacitive bridge including first and second capacitors having equal capacitance forming first and second legs of said bridge, a capacitive sensing head forming a third leg of said bridge, a variable capacitor forming the fourth leg of said bridge, and an inductor forming the bridging element of said bridge and connecting said first and third leg elements to said second and fourth leg elements,
   an oscillatory signal source connected across said bridge,
   uni-directional current means connected across said sensing head for establishing a negative reference voltage,
   an output stage,
   second uni-directional current means connected between the junction between said fourth capacitive leg of said bridge and said inductor and said output stage, and
   means for coupling said reference voltage to said output stage,
   said bridge circuit resonating at the output frequency of signal source,
   whereby when an object appears before said sensing head to change the capacitance thereof, a signal to said output stage is produced.

8. A capacitive sensing device comprising
   a capacitive bridge having four capacitive elements each forming an arm thereof,
   an A.C. source connected across said bridge,
   one of the ends of each of a first pair of said capacitive elements being connected together, one of the ends of each of a second pair of said capacitive elements being connected together, the other ends of said first pair of capacitive elements each being connected to the other end of one of said second pair of capacitive elements,
   impedance means for bridging the junctures between said first and second pairs of capacitive elements,
   one of the capacitive elements of said second pair forming a sensing head,
   first uni-directional current means connected across said sensing head,
   an output load,
   second uni-directional current means interposed between the other capacitive element of said second pair thereof and said output load, and resistor means bridging said second uni-directional current means.

9. The sensing device as recited in claim 8 wherein said impedance means comprises an inductor, said inductor resonating with said capacitive elements at the frequency of said A.C. source.

10. In a capacitive sensor,
    a capacitive bridge including first, second, third and fourth capacitive elements, said first and second capacitive elements being substantially equal in capacitance to each other, said third and fourth capacitive elements being substantially equal in capacitance to each other, said first capacitive element being connected in series with said third capacitive element, said second capacitive element being connected in series with said fourth capacitive element, an oscillatory signal source connected across said bridge, impedance means connected between the junction between said first and third capacitive elements and the junction between said second and fourth capacitive elements, said third capacitive element comprising a sensing head, first uni-directional current means connected across said sensing head for developing a reference voltage, output means, means for coupling said reference voltage to said output means, and second uni-directional current means connected between said fourth capacitive element and said output means, whereby when said bridge is in a "null" condition, there is no net voltage being fed to said output means therfrom and when said "null" condition is terminated by the appearance of an object before said sensing head, a signal voltage is fed to the output means from said bridge.

References Cited by the Examiner
UNITED STATES PATENTS
2,525,769  10/1950  Bruns _____ 340—366

OTHER REFERENCES

Publication: Sandretto, "Touch Plate Controller," Radio Electronics, September 1957, pp. 61, 78, 79.

NEIL C. READ, *Primary Examiner.*

R. M. GOLDMAN, *Assistant Examiner.*